May 16, 1933.  F. L. SCOTT  1,909,078

LUBRICATOR FOR EARTH BORING DRILLS

Filed July 17, 1930

Floyd L. Scott  Inventor

By Jesse R. Stone

Attorney

Patented May 16, 1933

1,909,078

UNITED STATES PATENT OFFICE

FLOYD L. SCOTT, OF HOUSTON, TEXAS, ASSIGNOR TO HUGHES TOOL COMPANY, OF HOUSTON, TEXAS, A CORPORATION OF TEXAS

LUBRICATOR FOR EARTH BORING DRILLS

Application filed July 17, 1930. Serial No. 468,720.

My invention relates to means for lubricating the cutters of roller earth boring drills.

Drill cutters on roller drills employed in deep well drilling must be designed to work at the bottom of wells of great depth where the static pressure of the liquid in the hole is very great. Oil wells a mile or more in depth are now common. As a result of these heavy liquid pressures on the outside of the cutter bearings, the mud in the hole tends to force itself into the bearings of the cutters even before the cutters are rotated. It is found that even where the cutter bearings are completely filled with lubricant before the drill is inserted into the well, there is sufficient air in solution in the lubricant to allow compression by the outer liquid sufficiently to permit entrance of mud to the bearings in the usual type of lubricator.

Also when the drill is operating, the bushings will wear and permit a play of the cutter upon the bushing, which results in a breathing or pumping action tending to suck the mud into the bearings. In this way, the action of the lubricant is greatly counteracted, and heating and excessive wear result.

It is an object of my invention to provide a lubricator which will overcome the defects above set out. I desire to prevent the entrance of mud to the bearings and to equalize the liquid pressures on both sides of the bearings so that mud will not tend to enter.

I aim to provide a small lubricant chamber in the head of the drill and to permit approximately the same pressure at the upper side of the lubricant as is experienced at the lower side of the lubricant channels and the cutter.

Referring to the drawing; Fig. 1 is a vertical section through a cutter of common construction shown in position upon one-half of the bit head and having my invention applied thereto.

Figure 1:
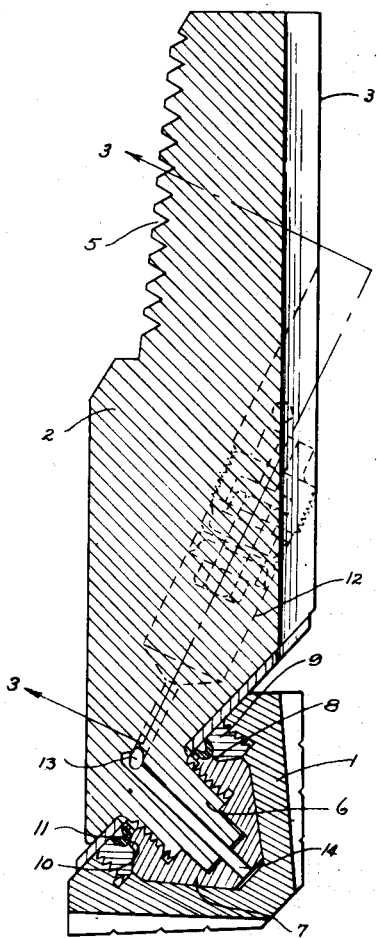
Figure 2:
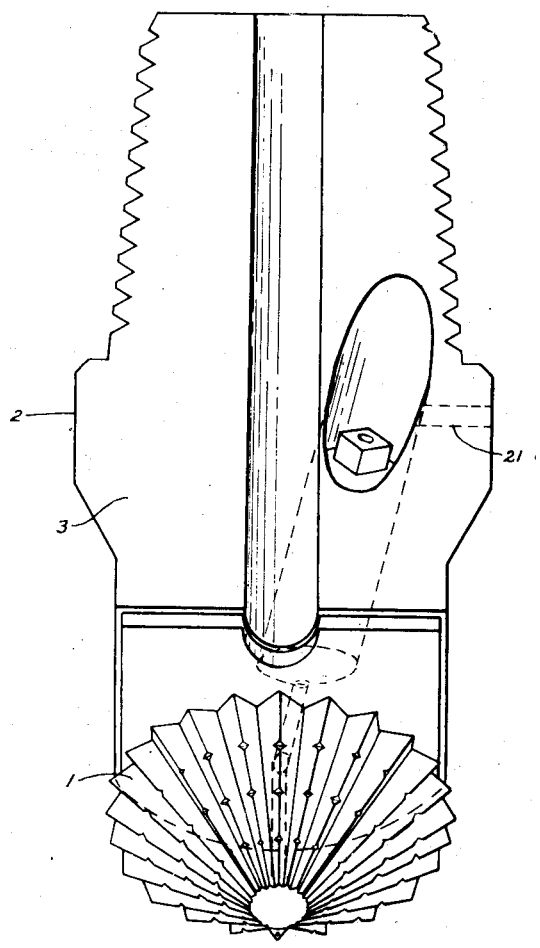
Fig. 2 is a side elevation of the half of the bit head shown in Fig. 1.

The drill shown is a hard formation bit having rolling cutters 1 thereon of approximately frusto-conical shape. The head is made up of two sections 2 adapted to fit together along the flattened faces 3. There are grooves 4 longitudinally of these faces 3, which when registered together form a longitudinal liquid passage axially of the head. The upper shank of the head is threaded at 5 to engage the drill collar.

The cutters 1 are mounted upon shafts 6 integral with the head and equipped with conical bushings 7 over which the cutter shells are fitted. The inner ends of the bushings 7 have a reduced neck 8 and a retaining ring 9 is screwed into the cutter behind the bushing to hold the cutter upon the bushing. This is all old and well known construction.

I have formed a groove 10 along the outer side of the meeting line between the ring 9 and the neck 8 of the bushing to receive a U-shaped packing ring 11 of rubber or some similar flexible wear resisting composition. This ring acts to prevent the entrance of mud to the bearing surfaces of the cutter.

I provide a lubricator including a cylindrical recess 12 bored downwardly from the flat face 3 of the head at an angle thereto and terminating above the shaft 6. A duct 13 leads from said recess through the shaft 6 to a lubricant channel 14 in the bushing and to the cutter bearings.

Figure 3:
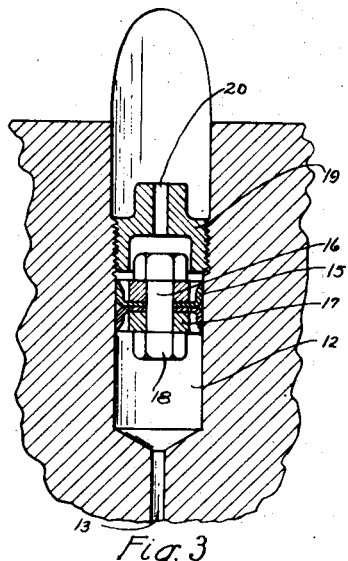
Fig. 3 is a sectional detail showing the lubricant chamber on the plane 3—3 of Fig. 1.

As will be best seen in Fig. 3, I have a piston in said recess; said piston including two packing cups 15 facing in opposite directions. Said cups are fitted upon a bolt 16 and clamped between two plates 17 thereon by a nut 18 on the lower end of the bolt. The upper end of the recess has a threaded plug 19 screwed therein. Said plug has a longitudinal opening 20 to allow entrance of liquid in the well sufficiently to equalize the liquid pressure at both ends of the lubricant passage. An opening from the outside at 21 allows liquid to enter above the piston.

In the use of my invention, the liquid pressure is equalized so as to prevent a tendency of the mud to enter about the bearings. Such pressure as is exerted around the outside of the cutter bearings is equalized by the liquid entering behind the plunger or piston 15.

Thus the packing ring 11 will seal off the entrance of mud to the bearings.

In the operation of the drill, when the bushings have become slightly worn, the pumping action of the cutter moving out and in upon the bushing will tend to pump lubricant from the recess 12 to the bearings, and this will be permitted by the piston 15, which is weighted by the bolt and the plates or washers 17, and tends to jar down by gravity and move the lubricant below it to the bearing surfaces. It is obvious that the piston can be forced back also by any pumping action of the cutter on the bushings, and there will be no tendency to suck mud in about the seal ring 11.

The life of the bushings will be prolonged by this structure and also the ease of handling the present lubricator compared with the older types will be facilitated.

What I claim as new is:

1. In a roller well drill, a head, a non-rotatable cutter shaft thereon, a cutter rotatably mounted on said shaft, means for conducting lubricant to the bearing surfaces between the cutter and the shaft, and a packing ring, U shaped in cross section, engaging both the cutter and the shaft and having its convex side facing toward said bearing surfaces.

2. In a roller well drill, a head, a non-rotatable cutter shaft thereon, a cutter rotatably mounted on said shaft, a lubricant chamber in said head, means to equalize the fluid pressure thereon, means for conducting lubricant from said chamber to the bearing surfaces between the cutter and the shaft, and a packing ring, U shaped in cross section, engaging both the cutter and the shaft and having its convex side facing toward said bearing surfaces.

In testimony whereof, I hereunto affix my signature, this 12th day of July, A. D., 1930.

FLOYD L. SCOTT.